Inventors
Karl J. Braun
Louis Cetran
By their Attorney
Vincent A. White

May 29, 1962 K. J. BRAUN ET AL 3,036,764

RECORD DECODING APPARATUS

Filed Sept. 11, 1958 6 Sheets-Sheet 2

May 29, 1962 K. J. BRAUN ET AL 3,036,764

RECORD DECODING APPARATUS

Filed Sept. 11, 1958 6 Sheets-Sheet 3

United States Patent Office 3,036,764
Patented May 29, 1962

3,036,764
RECORD DECODING APPARATUS

Karl J. Braun, Springdale, and Louis Cetran, Hartford, Conn., assignors to A. Kimball Company, Brooklyn, N.Y., a corporation of New York Filed Sept. 11, 1958, Ser. No. 760,449
6 Claims. (Cl. 235—61.11)

This invention relates to improvements in apparatus for analyzing records having data encoded thereon. More particularly the invention relates to new and novel apparatus for decoding coded data and for controlling the operation of data processing devices according to the value of such data. By way of illustration and not to limit the broader aspects of the invention such devices may include card reproducers, tabulators, printers and other devices utilized in the data processing field. One form of the invention is illustrated as applied to the decoding of information sensed from perforated merchandise tags and for reproducing the decoded information into perforated tabulating cards. It should be understood that other types of records, for example, having magnetized spots or printed dots could be analyzed according to the invention by utilizing appropriate sensing means.

There is disclosed in a copending application Serial No. 684,525, now patent No. 2,973,142, filed September 17, 1957, in the name of R. K. Jenner, Jr., a record analyzing machine adapted to sense information punched in tags and to decode such information for use in controlling the operation of devices such as above noted. As disclosed in that application, for each coding index position on the tag there is provided a corresponding electrical switching relay which is energized upon sensing of a data indication in the corresponding position of the tag. Since there are twenty-nine columns of data in the tag disclosed and there are four code index positions in each column there are thus one-hundred and sixteen relays required to decode all data possibilities in the tag. Due to the large number of relays there results highly complex and expensive electrical decoding circuits. While good performance may be expected from such a decoding apparatus the large number of relays and resultant high costs render the machine somewhat objectionable.

Accordingly, it is a principal object of the invention to provide a machine of substantially reduced cost. According to the invention, for each code index position on the record there is provided a decoding slide having a plurality of switching means. The slides are arranged in groups corresponding to the columns of code index positions of the tag. The switching means of the present embodiment comprises pins differentially arranged in each slide to cooperate with similar pins on adjacent slides of the same group for decoding the information sensed from the tag. The slides of each group are adapted to be displaced relative to each other according to the data indications sensed in a corresponding column of the tag. As the slides are displaced, particular pins are aligned to form a distinctive conductive path through all the slides of the group, there being a different path formed for each possible digit represented in the tag. While the digits from 0–9 are recorded in the tag in a multi-position code, each coded digit, after sensing, is represented by the selection of one of ten possible conductive paths through a group of decoder slides. By increasing the number of pins in each slide and expanding the code used alphabetic information could also be decoded.

The above and other features of the invention including various novel details of construction and combinations of parts will now be more particularly described with reference to the accompanying drawings and pointed out in the claims.

Figure 15:
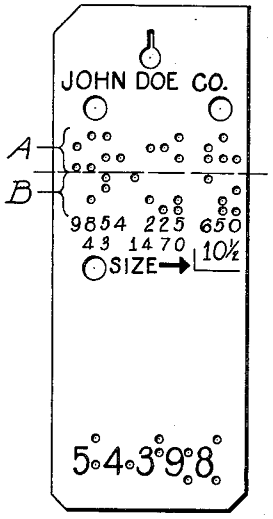
Figure 16:
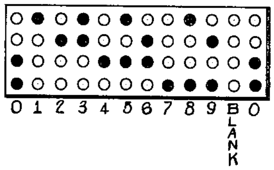
Figure 17:
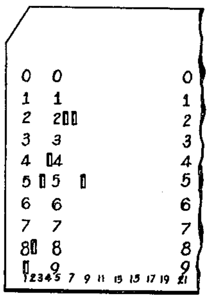

FIGS. 5 through 14 diagrammatically illustrate the decoding of the digits 0–9 respectively;

FIG. 15 illustrates a typical perforated merchandise tag to be sensed and decoded;

FIG. 16 diagrammatically illustrates the code used in the tag of FIG. 15;

FIG. 17 illustrates a typical record card; and

Figure 18:
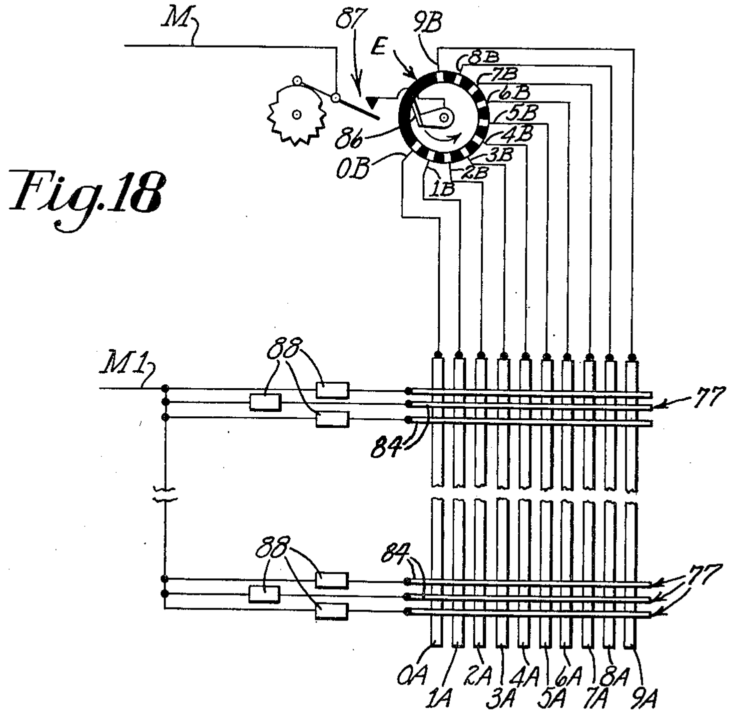

FIG. 18 illustrates a typical control circuit for a data processing device in which the decoder units may be incorporated.

The invention will now be described by way of example in its application to the analyzing and reproduction of perforated data in a type of merchandise tag illustrated in FIG. 15. As illustrated, the tag is provided with a plurality of punched information index point positions arranged in twenty-nine columns each having four punching positions. A row A of twelve vertical columns each having four possible hole positions is arranged adjacent the upper end of the tag with another row B of twelve additional columns in line and directly below the row A. Five additional columns are provided adjacent the lower end of the tag. The code used for punching data in the tag is a well-known four element modified binary code having the bit or positional values of 1, 2, 4 and 7. The code, with corresponding digital values, is illustrated in FIG. 16. The tag is also provided with three locating and feed holes of relatively large diameter arranged in fixed positions relative to the data indicative perforations.

A typical record card in which the data recorded on the tag can be reproduced is illustrated in FIG. 17. The card is provided with a number of vertical columns each having ten possible punching positions. For the present purposes only one position in each column is punched to record a single digit. The data represented in each column of the tag in the four bit code is decoded into its digital value which is then punched into one position of a corresponding column of the record card.

Figure 1:
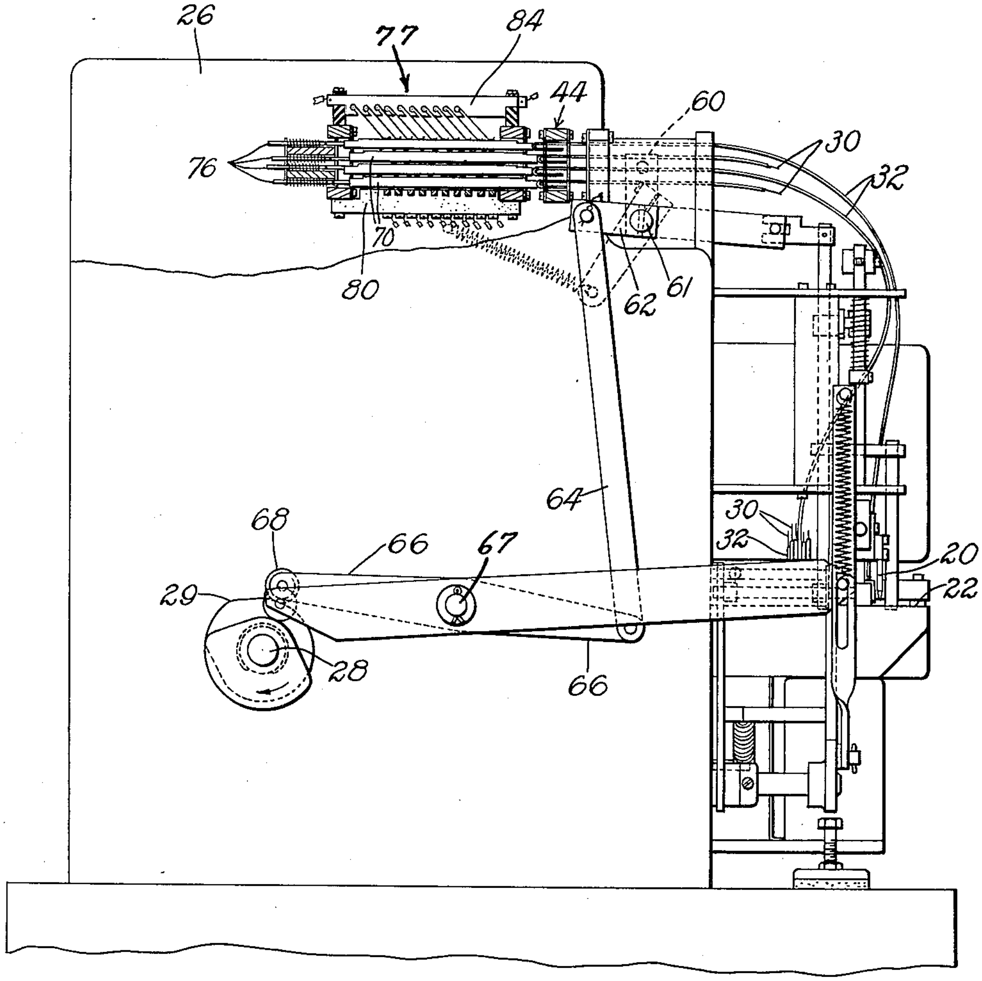
FIG. 1 is a side elevation of a machine embodying the invention.
Figure 2:
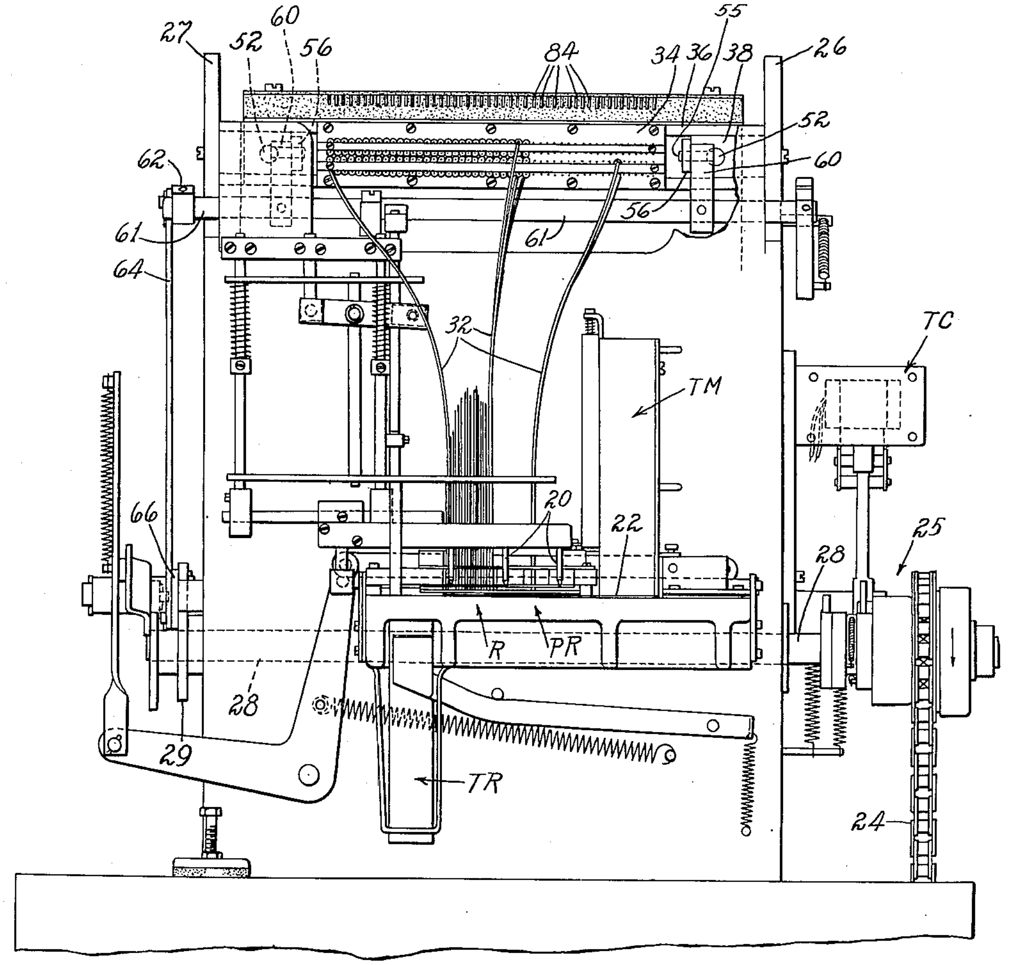
FIG. 2 is a front elevation of the machine.

The tag reader for feeding and sensing the tags to be reproduced is illustrated in FIGS. 1 and 2. The tag feeding and sensing mechanisms utilized are generally similar to those illustrated in the above-noted application Serial No. 684,525, Patent No. 2,973,142, and reference may be had thereto if additional information is desired. It should be obvious that other means for sensing could be utilized without affecting the scope of the invention.

As illustrated, perforated tags are moved one at a time from a magazine TM and thereafter fed by feed pins 20 along a table 22 to a pre-read station PR, a read station R and thereafter to a receiver TR. At the read station R the code perforations in each tag are sensed and the sensed information is decoded into corresponding digital values in a manner to be described.

For driving the tag feeding and sensing mechanisms the tag reader is provided with a motor (not shown) which, by means of a chain 24 (FIG. 2), drives a driving member of a clutch mechanism 25. The clutch mechanism is not illustrated in detail but may be of any suitable type adapted to provide one revolution for each actuation of the clutch. To actuate the clutch there is provided a clutch magnet TC mounted on a side wall 26. The clutch is adapted upon energization of the magnet TC to cause rotation of a cam shaft 28, the shaft being journaled at opposite ends, in suitable bearings in side walls 26 and 27. To the left of the side wall 27, as seen in FIG. 2, the cam shaft has fixed thereto a cam 29, the purpose of which will presently appear.

Figure 3:
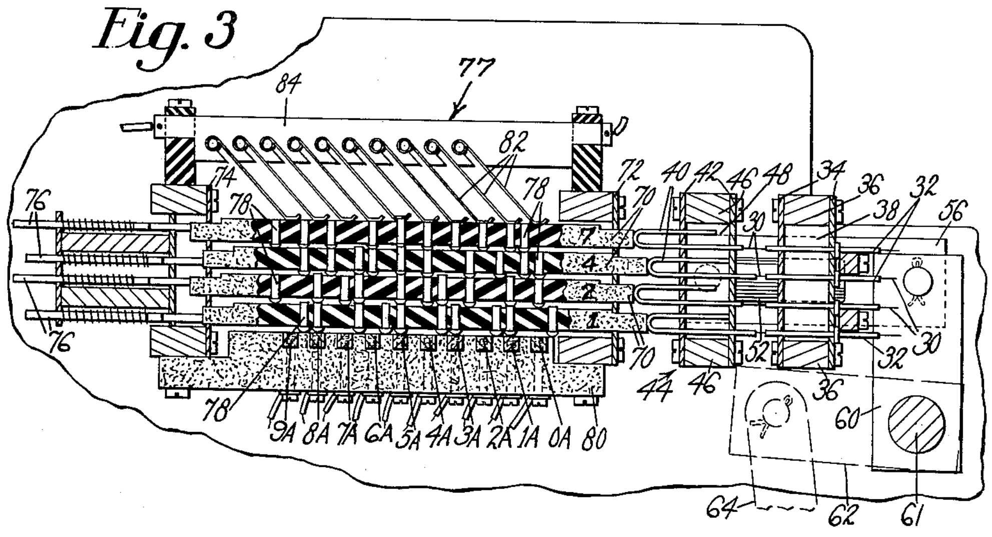
FIG. 3 is a view in section through one of the decoding units.
Figure 4:
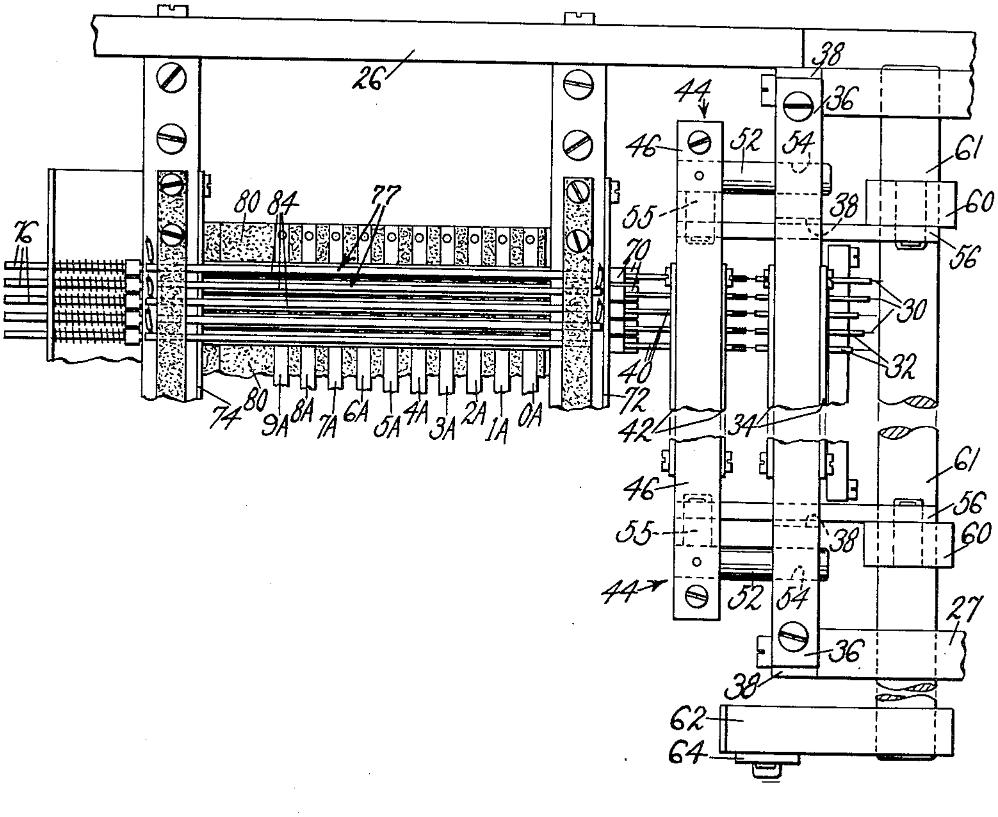
FIG. 4 is a plan view of a portion of the machine.
Figure 5:
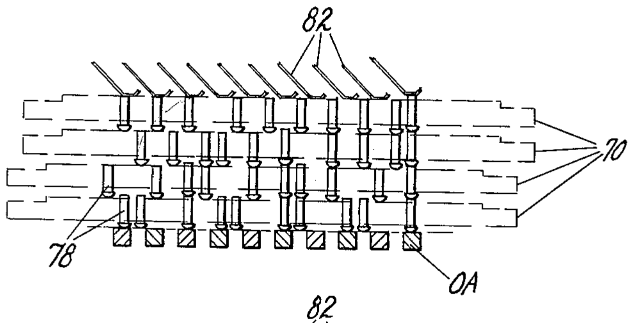
Figure 6:
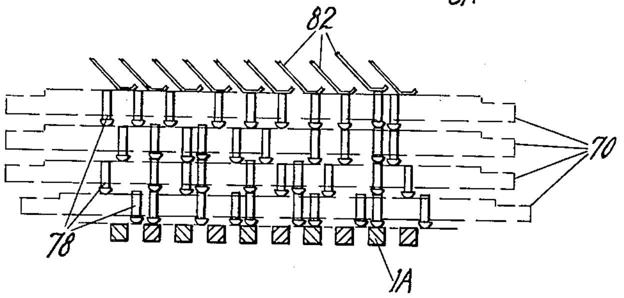
Figure 7:
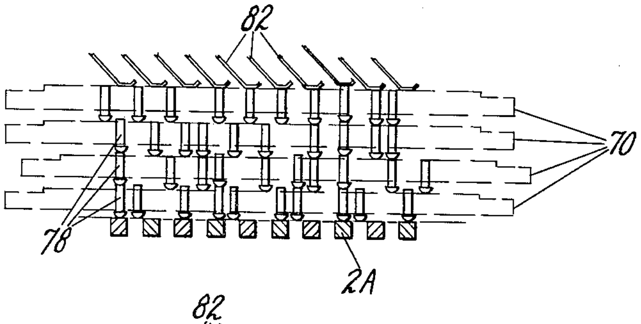
Figure 8:
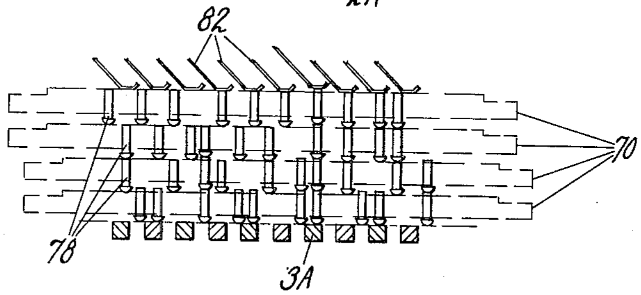
Figure 9:
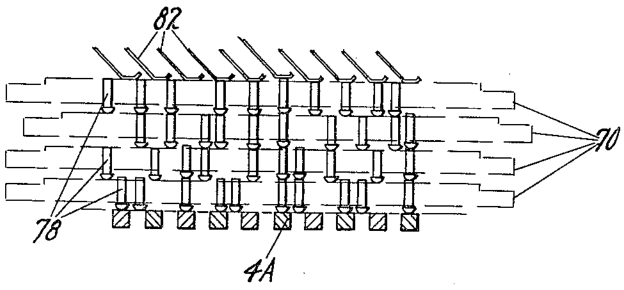
Figure 10:
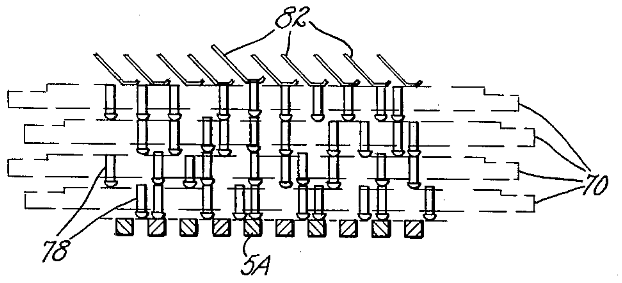
Figure 11:
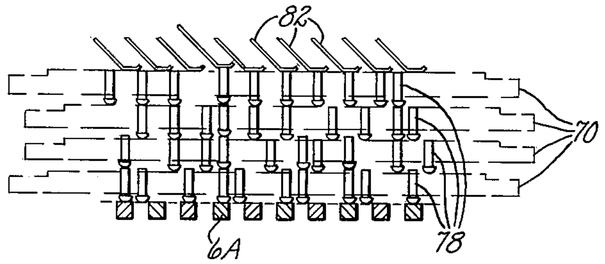
Figure 12:
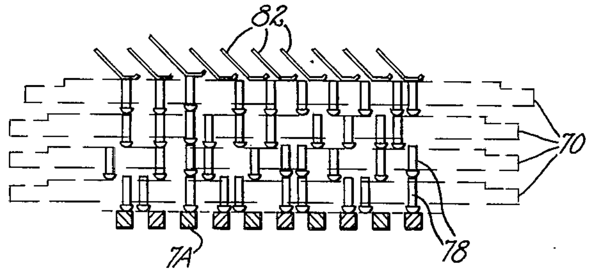
Figure 13:
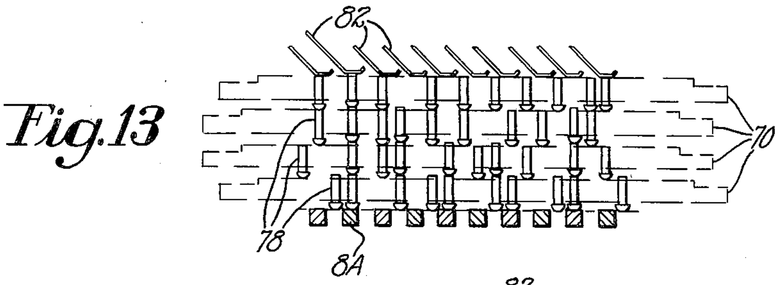
Figure 14:
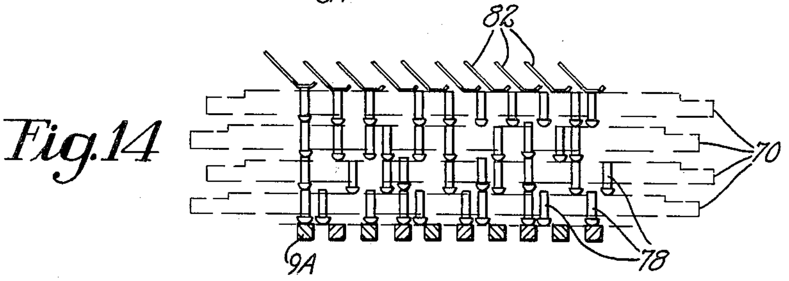

For sensing the presence of code holes in the columns of the tag at the read station, a sensing wire 30 (FIGS. 1 and 3) is provided for each possible code index position in the tag. In the present construction, provision is made for one-hundred and sixteen such wires at the read station. Each sensing wire operates within a tubular casing 32 which at its lower end is secured at the read station R in a manner fully disclosed in the above-mentioned application. Referring to FIGS. 3 and 4, the upper end of each casing 32 is received in spaced holes provided in two parallel plates 34 which are secured to two cross bars 36. The cross bars at opposite ends thereof are secured to blocks 38 fixed to the side walls 26 and 27, respectively. The upper end of each sensing wire 30 is fixed to a U-shaped tube 40 which is slidably mounted within a pair of plates 42 forming part of an oscillating unit 44. The oscillating unit includes the plates 42 which are secured to a pair of cross plates 46 which in turn are fixed at opposite ends to a pair of blocks 48 (FIG. 3). Each block 48 has fixed thereto a forwardly extending slide pin 52 (FIG. 4), both pins being slidably received in bores 54 in the blocks 38. The blocks 48 are also provided with inwardly extending pins 55 to which are pivoted links 56. The links, at their forward ends, are pivotally connected to the upper ends of arms 60 fixed to a shaft 61 which is journaled at opposite ends in the side walls 26 and 27. To the left end of the shaft 61, as seen in FIG. 2, is fixed a rearwardly extending arm 62 (see also FIG. 1) connected by a depending link 64 to a cam lever 66. The cam lever is journaled on a stud 67 and is provided at its rearward end with a roll 68 which rides on the periphery of the cam 29. During rotation of the cam 29 the lever 66 is oscillated and, through the link 64, the arms 62 and 60 are swung forward and rearward to move the oscillating unit 44 to and from sensing position. The rearward end of each U-shaped tube 40 engages an associated decoding slide 70 (FIG. 3), each of the slides being slidably supported in rectangular slots punched in stationary plates 72 and 74. Each of the slides is formed of a dielectrical material and is urged forwardly by a spring-pressed plunger 76, there being an individual plunger for each slide. Thus each of the plungers acts through a decoding slide to urge a corresponding sensing wire 30 forwardly and downwardly through a casing 32 toward a corresponding code hole index position in a tag at the read station R. Since there are four possible code index positions in each column of the tag there are also four decoding slides 70 for each column of the tag. Thus for each column of information on the tag there is a corresponding group of four decoding slides forming a decoding unit 77 adapted to decode the code perforations sensed in that column.

Referring to FIG. 3, the decoding slides 70 are numbered 1, 2, 4 and 7, respectively. This numbering is for the purpose of relating the slides to code hole positions having a corresponding position value in the tag code illustrated in FIG. 16. In its initial position the oscillating unit 44 is held to the left of the position shown in FIG. 3 holding the U-shaped tubes 40 to the left by means of the forward plate 42, holding the slides 70 to the left against the action of their respective spring plungers 76 and maintaining the wires 30 retracted from the tag. As the oscillating unit 44 is moved forward during the sensing cycle of the machine, the forward plate 42 moves away from the ends of the U-shaped tubes 40 allowing the spring plungers 76 to urge the slides 70 forwardly and hence also urge the sensing wires 30 down to probe the tag. Where a hole is present in the tag a sensing wire passes through the hole allowing its associated slide 70 to continue its movement. Where no hole exists, downward progress of the wire is halted by the tag holding the associated slide 70 in retracted position.

As seen in FIG. 3, the mechanism is shown in the positions assumed when the oscillating unit 44 has moved to its most forward position causing the sensing wires to probe for code holes in the tag. As illustrated, the sensing wires for the number 1 and the number 4 decoding slides have found holes in the corresponding column of the tag and these slides have advanced beyond the number 2 and 7 slides. This combination of slide displacement represents the digit five in code. For other combinations indicating other digits reference may be had to FIGS. 5 through 14..

Referring again to FIG. 3, it may be seen that each of the decoding slides 70 is provided with a plurality of vertical pins 78. Since the slides are formed from a dielectrical material each of the pins in a slide is electrically isolated from the others. The pins are differentially spaced in each slide and cooperate with the pins in adjacent slides of the same unit in such manner that for each coded digit sensed in a tag resulting in a different combination of slides displaced, a different combination of pins will be axially aligned forming only one complete electrical path through the decoder unit peculiar to each digit. It will be observed that for each combination of slides displaced only one of ten possible paths will be formed by the pins.

For each path that may be selected there is provided a single bar which forms a part of one of ten control circuits as will presently appear, there being ten bars numbered 0A–9A. As seen in FIG. 3, the aligned pins indicate the digit five. These pins are aligned with and make electrical contact only with the bar 5A. The bars are carried in a stationary plate 80 formed of dielectrical material so that each bar is electrically isolated from the others. The bars extend across the machine under all of the decoding units for a purpose that will presently appear.

Each unit of decoding slides also has associated therewith a group of conductor springs 82 which at their lower ends engage the pins 78 of the upper slide of the unit. The upper ends of the springs are fixed in a common conductor bar 84, there being an individual and electrically isolated bar 84 for each decoding unit.

Each of the bars 0A–9A is individually connected to segments 0B–9B, respectively, of an emitter E as diagrammatically illustrated in FIG. 18. The emitter is provided with a rotating brush 86 which wipes over successive segments 0B–9B in timed relation to the feed of a tabulating card under punches adapted to punch the card in a row-by-row fashion in a manner generally described in the above-mentioned copending application Serial No. 684,525, Patent No. 2,973,142. As illustrated in FIG. 18, the brush 86 is intermittently connected to a line wire M through a circuit breaker 87. Each of the conductor bars 84 is individually connected to a single punch magnet 88 which is arranged to cause operation of a punch upon energization. The other side of the punch magnet is connected to a line wire M1. A suitable source of electrical power (not shown) is connected across the line wires M and M1.

By way of example, assume that a card ot be punched has been fed so that the number 5 row (see FIG. 17) of the card is under the punches. The emitter brush 86 is then in contact with the segment 5B of the emitter. Thus, the 5A bar common to all decoder slide groups is connected to the line wire M through the emitter. For each decoder unit in which a decoder path is closed indicating the digit 5, a closed circuit is completed from the line wire M through the circuit breaker 87, the brush 86, the emitter segment 5B, bar 5A, each decoder column indicating the digit 5, and through the associated punch magnets 88 to the line wire M1. However, for the decoder units in which digits other than 5 are indicated no closed path is formed to the bar 5A and the associated punch magnets are not energized. Each punch magnet when energized causes punching in a particular column and in the appropriate row of the card by attracting an interposer under an oscillating bail. The bail acting on the attracted interposers forces only the associated punches through the card. The same operation of the card punching mechanism is repeated for each of the card rows, the emitter successively searching the bars 0A–9A for any closed paths that may exist in any decoder column.

Having thus described our invention, what we claim as new and desire to secure by Letters Patent of the United States is:

1. In a device adapted to analyze coded records by sensing code indications in a record: a plurality of slides displaceable according to the indications sensed in said record, said slides being arranged in groups corresponding to columns of associated code indications in said record, a plurality of conductor pins carried by each slide in such manner that each of said pins makes or breaks direct electrical contact with associated pins carried by adjacent slides of the same group, the arrangement of pins in each slide also being such that displacement of the slides according to the indications sensed causes one pin in each slide to become axially aligned with associated pins in each other slide of a group thereby forming a closed electrical circuit through said group of slides corresponding to the data represented by a column of indications in said record.

2. In a device adapted to analyze coded records by sensing code indications in a record: a plurality of slides each displaceable according to the individual code indications sensed, said slides being arranged in groups corresponding to groups of associated code indications in said record, a plurality of conductors carried by each slide in such manner that upon displacement of the slides each of said conductors makes or breaks direct conductive contact with associated conductors carried by adjacent slides of the same group, the arrangement of conductors in each slide also being such that displacement of the slides according to the code indications perforations sensed causes one conductor in each slide to become aligned with associated conductors in each other slide of a group thereby forming a closed conductive path through said group of slides corresponding to the data represented by a group of code indications in said record.

3. In a device adapted to decode records having groups of multipositional code indications by sensing a record to determine the presence or absence of each possible code indication: a plurality of groups of slides, each group being associated with a particular group of code indications, each slide being displaceable between two positions according to the presence or absence of an individual code indication, a plurality of conductors in each slide arranged in such manner that each conductor makes or breaks conductive contact with associated conductors in adjacent slides of the same group, the arrangement of said conductors and slides being such that for any given displacement pattern of the slides, one conductor in each slide makes conductive engagement with associated single conductors in adjacent slides to form one of a plurality of possible conductive paths representative of the digital value of the code indications.

4. A device for decoding data encoded on records in a multi-positional code including a plurality of parallel superposed slides relatively movable lengthwise between two positions, spaced conductor pins differentially arranged along the length of each slide, each pin being adapted to make or break conductive engagement with individual associated pins in adjacent slides depending on the relative position of said slides, and means for moving each slide to one or the other of said two positions depending on the presence or absence of individual code indications on a record for causing one pin in each slide to be axially aligned with and make conductive engagement with one pin in each other associated slide for forming one of a plurality of possible conductive paths representative of the digital value of the code indications on a record.

5. A device for decoding data encoded on records in a multi-positional code including a plurality of parallel superposed slides, each individually displaceable lengthwise between two positions according to the presence or absence of an individual code indication, and isolated conductor pins differentially arranged along the length of each slide and adapted to make or break conductive engagement with associated pins in adjacent slides depending on the relative position of said slides whereby said slides are displaced in a pattern according to distinctive combinations of code indications causing one pin in each slide to be axially aligned with and make conductive engagement with one pin in each other associated slide for forming one of a plurality of possible conductive paths representative of the digital value of the code indications on a record.

6. A device for decoding data encoded on records in a multi-positional code, including a plurality of parallel superposed slides each individually displaceable lengthwise between two positions depending on the presence or absence of an associated code indication on a record, spaced conductor pins differentially arranged along the length of each slide and extending through and axially movable in the slide in a direction normal to the slide movement so that movement of the slides to one or the other position causes each pin to be either axially aligned and make conductive engagement with associated pins in adjacent slides or to be displaced out of alignment and break conductive engagement with said associated pins, terminal strips yieldingly engageable with the pins extending from one side of the superposed slides, and fixed terminal bars each engageable with individual pins extending from the other side of the superposed slides whereby when the slides are displaced according to the code indications on a record one pin in each slide becomes aligned and stacked end to end with a single pin in each other slide along a common axis so that each aligned pin is displaced to cause the terminal strip to yield and exert a greater pressure against the aligned pins thereby causing firm conductive engagement between the pins, the terminal strip and the terminal bar for forming one of a plurality of possible conductive paths representative of the digital value of the code indications on a record.

References Cited in the file of this patent

UNITED STATES PATENTS

| | | |
|---|---|---|
| Re. 22,394 | Moore et al. | Nov. 23, 1943 |
| 1,968,123 | Bricken | July 31, 1934 |
| 2,002,208 | McFarlane | May 21, 1935 |
| 2,049,719 | Peirce et al. | Aug. 4, 1936 |
| 2,072,447 | Gray | Mar. 2, 1937 |
| 2,482,242 | Brustman | Sept. 20, 1949 |
| 2,675,176 | Perrin | Apr. 13, 1954 |
| 2,899,676 | Rivers et al. | Aug. 11, 1959 |

UNITED STATES PATENT OFFICE

CERTIFICATE OF CORRECTION

Patent No. 3,036,764 May 29, 1962

Karl J. Braun et al.

It is hereby certified that error appears in the above numbered patent requiring correction and that the said Letters Patent should read as corrected below.

Column 4, line 62, for "ot" read -- to --; column 5, line 40, strike out "perforations --.

Signed and sealed this 24th day of September 1963.

(SEAL)
Attest:

ERNEST W. SWIDER
Attesting Officer

DAVID L. LADD
Commissioner of Patents